(12) United States Patent
Zhou et al.

(10) Patent No.: US 11,086,157 B1
(45) Date of Patent: Aug. 10, 2021

(54) DISPLAY DEVICE

(71) Applicant: WUHAN CHINA STAR OPTOELECTRONICS TECHNOLOGY CO., LTD., Hubei (CN)

(72) Inventors: Wei Zhou, Hubei (CN); Gege Zhou, Hubei (CN); Chao Liang, Hubei (CN); Zhongjie Liu, Hubei (CN); Yan Cheng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/049,355

(22) PCT Filed: Aug. 24, 2020

(86) PCT No.: PCT/CN2020/110775
§ 371 (c)(1),
(2) Date: Oct. 21, 2020

(30) Foreign Application Priority Data

Aug. 5, 2020 (CN) .......................... 202010775853.8

(51) Int. Cl.
*G02F 1/1333* (2006.01)
*F21V 8/00* (2006.01)

(52) U.S. Cl.
CPC .. *G02F 1/133317* (2021.01); *G02F 1/133314* (2021.01); *G02F 1/133331* (2021.01); *G02B 6/0051* (2013.01); *G02B 6/0053* (2013.01); *G02B 6/0055* (2013.01); *G02F 2201/501* (2013.01); *G02F 2202/28* (2013.01)

(58) Field of Classification Search
None
See application file for complete search history.

(56) References Cited

U.S. PATENT DOCUMENTS

2018/0107052 A1    4/2018  Jiang et al.

FOREIGN PATENT DOCUMENTS

| CN | 105607332 A | 5/2016 |
| CN | 107942570 A | 4/2018 |
| CN | 110376780 A | 10/2019 |
| CN | 110853522 A | 2/2020 |
| CN | 111128024 A | 5/2020 |
| JP | H0627442 A | 2/1994 |

*Primary Examiner* — Vip Patel

(57) ABSTRACT

A display device is provided, which includes a middle frame, a first substrate, a second substrate, a cover plate, an ink layer, and a silicone glue. By providing a barrier block or a slot disposed on a side of the ink layer close to the first substrate, the barrier block is disposed between the silicone glue and a side frame to prevent the ink layer on the cover plate from spreading of a pollution source, so that a surface of the ink layer of a glass cover plate of a display module can meet dyne specification requirements. It also ensures an adhesive strength of the middle frame and the cover plate to prevent bonding failure.

13 Claims, 4 Drawing Sheets

DISPLAY DEVICE

FIELD OF INVENTION

The present invention relates to the field of display technologies, and in particular to a display device.

BACKGROUND OF INVENTION

As shown in FIG. 1, in a field of display terminals, usually a periphery of a glass cover 11 of a display module and a bearing surface of a middle frame 12 of an entire device are glued and fixed. Therebetween, factors affecting bonding characteristics and functions mainly come from a difference in an ink surface 13 (bonding surface) of the glass cover. One way to measure surface energy is dyne level. Generally, in an actual display product terminal, the dyne level of the glued ink surface of the glass cover after cleaning is required to be no less than 36.

Technical Problem

In conventional art, in order to meet the dyne level requirement, a surface cleanliness of the glass cover needs to be controlled during a manufacturing process. Cleaning methods mainly include plasma and alcohol wiping. Existing solutions are limited to a fact that foreign matter on a surface of the glass cover can be directly removed without leaving any residue after cleaning. If the glued surface of the glass cover of the display module cannot be physically or chemically cleaned to remove contaminants, an end product of the display is at risk of use and reliability. In a display module process, there is contamination with existing materials such as silicone glue 14, which is used for adhesive bonding between a display screen (LCD glass) and the glass cover. Silicone glue contains chemical components such as silicone oil which is easy to precipitate. Silicone oil has a negative effect on the dyne level of the ink surface. Specifically, When the silicone oil continuously precipitates out of the silicone glue, it will be dispersed in microscopic voids of the ink surface 13 through its capillary and other physical diffusion effects on the ink surface 13 where it is attached. However, the existing cleaning method cannot completely wipe it. Residual silicone oil causes the dyne level of the ink surface of the glass cover to exceed the standard (less than 36). A main component of silicone glue is trimethoxy-terminated polydimethylsiloxane, which forms a chemically stable siloxane polymer after curing. Low molecular weight siloxane (D3-D10) is mixed into the polymer macromolecule, and because of its strong volatility, it will volatilize and adhere to a substrate (such as CG screen printing ink) during and after curing of the silicone. Because a methyl group at an end of a chain exhibits hydrophobic characteristics, it changes a surface condition, such as reduced surface energy (decrease in dyne level).

SUMMARY OF INVENTION

Technical Solutions

The purpose of the present invention is to provide a display device that prevents an ink layer from being contaminated and improves product performance.

In order to achieve the above objective, the present invention provides a display device, including a middle frame including a bottom plate and a side frame; a first substrate including a display region and a non-display region disposed above the bottom plate; a second substrate disposed above the display region of the first substrate; a cover plate disposed above the second substrate and the side frame; an ink layer disposed on a side of the cover plate close to the first substrate and corresponding to the non-display region, wherein a part of the ink layer is positioned corresponding to the middle frame; and a silicone glue disposed between the ink layer and the first substrate and corresponding to the non-display region; wherein a barrier structure is provided on a side of the ink layer close to the first substrate.

Furthermore, the barrier structure includes a slot or a barrier block.

Furthermore, the ink layer includes a first ink layer disposed on the side of the cover plate close to the first substrate, and a cover bottom layer disposed on a side of the first ink layer away from the cover plate.

Furthermore, the barrier block is disposed between the side frame and the silicone glue.

Furthermore, a thickness of the barrier block is same as a thickness of the silicone glue, and a material of the barrier block includes ink.

Furthermore, the barrier block is disposed on a side of the cover bottom layer away from the first ink layer.

Furthermore, the slot is defined between the side frame and the silicone glue.

Furthermore, the slot extends downward to an upper surface of the first ink layer.

Furthermore, a printing ink layer is arranged in the slot.

Furthermore, the display device further including a lower polarizer disposed on a side of the first substrate away from the second substrate; an upper polarizer disposed on a side of the second substrate away from the first substrate; an optically clear adhesive (OCA) glue layer disposed between the upper polarizer and the cover plate; and a backlight structure disposed between the lower polarizer and the bottom plate; wherein the backlight structure includes a backplate including a support plate and a side plate; a reflective layer disposed on the support plate; a light guide plate disposed on the reflective layer; a scattering layer disposed on the light guide plate; a prism layer disposed on the scattering layer; and a backlight source disposed at an end of the light guide plate and disposed on the side plate.

Beneficial Effect

The beneficial effects of the present invention are as follows. The present invention provides a display device, and by providing the barrier block or the slot on the side of the ink layer close to the first substrate, the barrier block is disposed between the silicone glue and the side frame to prevent the ink layer on the cover plate from spreading of a pollution source, so that an ink layer surface of the glass cover plate of the display module can meet dyne specification requirements. It also ensures an adhesive strength of the middle frame and the cover plate to prevent bonding failure.

BRIEF DESCRIPTION OF FIGURES

The following describes the specific embodiments of the present application in detail with reference to the accompanying drawings, which will make the technical solutions and other beneficial effects of the present application obvious.

Figure 1:
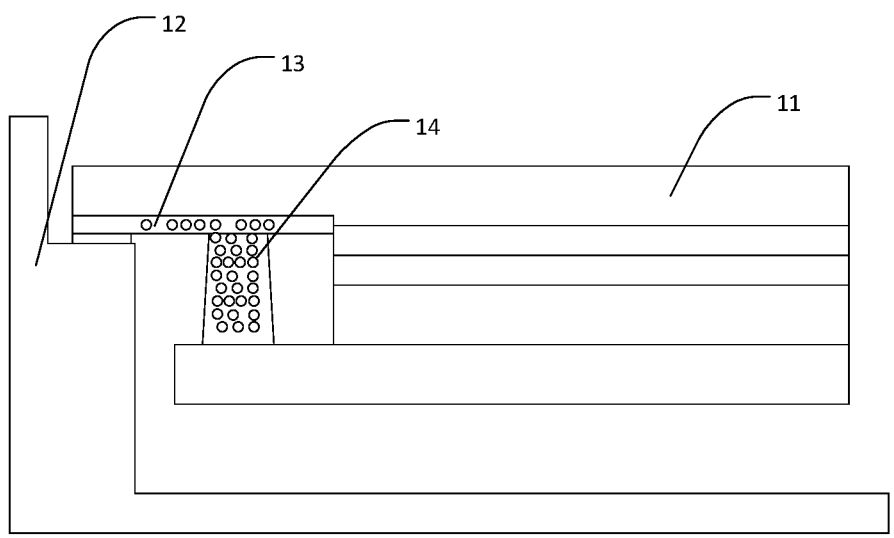
FIG. 1 is a schematic structural diagram of a display device according to a conventional art.

Reference numerals of the present invention are:

display device 100;

middle frame 104; first substrate 101; second substrate 102;

cover plate 103; ink layer 108; silicone glue 109;

bottom plate 1041; side frame 1042; barrier block 1011;

lower polarizer 105; upper polarizer 106; optically clear adhesive (OCA) glue layer 107;

backlight structure 110; backplate 111; reflective layer 112;

light guide plate 113; scattering layer 114; prism layer 115;

backlight source 117; chip on film 1012; support plate 1111;

side plate 1112; spacer pad 116; display region 120; and non-display region 130.

DETAILED DESCRIPTION OF EMBODIMENTS

The specific structure and functional details disclosed herein are only representative, and are used for the purpose of describing exemplary embodiments of the present application. However, the present application can be implemented in many alternative forms, and should not be interpreted as being limited only to the embodiments set forth herein.

In the description of the present invention, it is to be understood that the terms such as "center", "transverse", "upper", "lower", "left", "right", "vertical", "horizontal", "top", "bottom", "inside", "outside", etc., the orientation or positional relationship of the indications is based on the orientation or positional relationship shown in the drawings, and is merely for the convenience of the description of the application and the simplified description, rather than indicating or implying that the device or component referred to has a specific orientation, in a specific orientation. The construction and operation are therefore not to be construed as limiting the invention. In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features. In the description of this application, unless otherwise specified, "plurality" means two or more. In addition, the term "including" and any variations thereof is intended to cover non-exclusive inclusion.

In the description of the present application, it should be noted that the terms "installation", "connected", and "coupled" should be understood in a broad sense, unless explicitly stated and limited otherwise. For example, they may be fixed connections, removable connected or integrally connected; it can be mechanical, electrical, or can communicate with each other; it can be directly connected, or it can be indirectly connected through an intermediate medium, it can be an internal communication of two elements or an interaction relationship of two elements. For those of ordinary skill in the art, the specific meanings of the above terms in the present application can be understood according to specific situations.

The terms used herein are only for describing specific embodiments and are not intended to limit the exemplary embodiments. Unless the context clearly dictates otherwise, the singular forms "a" and "one" used herein are also intended to include the plural. It should also be understood that the terms "including" and/or "including" used herein specify the existence of the stated features, integers, steps, operations, units and/or components, and do not exclude the existence or addition of one or more other features, integers, steps, operations, units, components, and/or combinations thereof.

Figure 2:
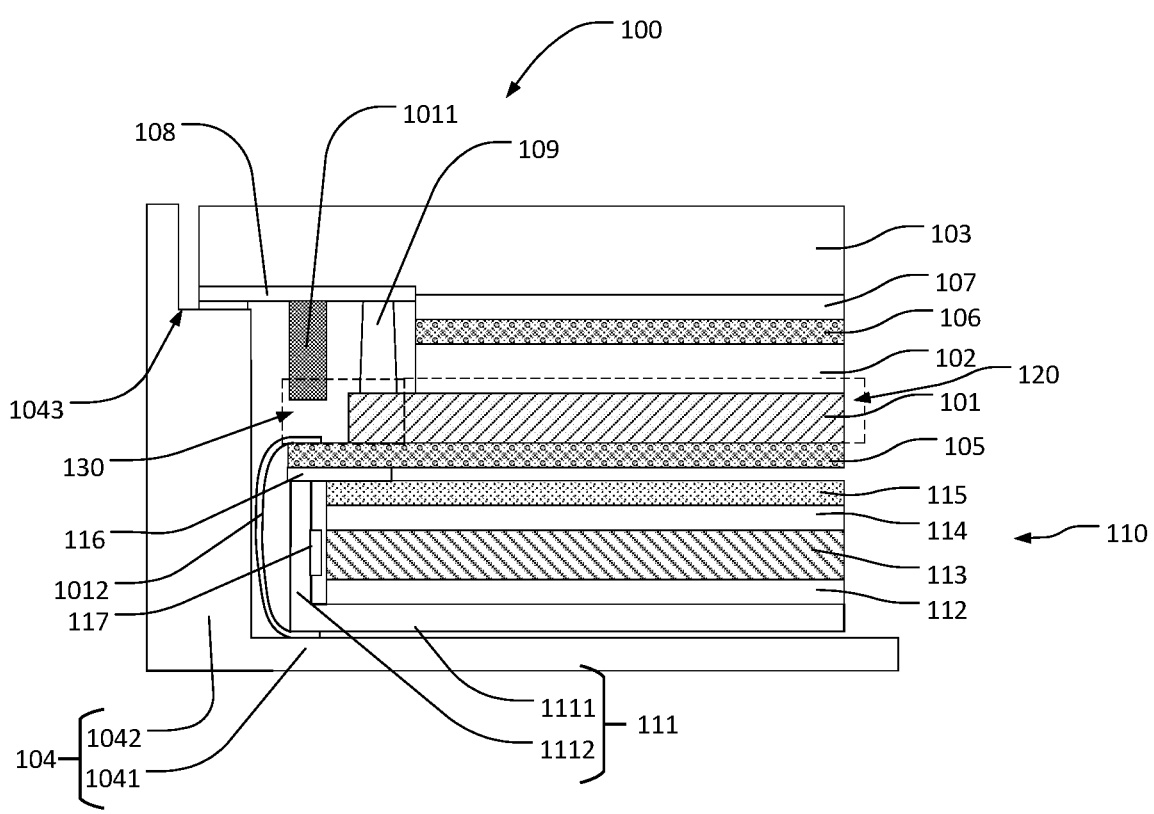
FIG. 2 is a schematic structural diagram of a display device according to a first embodiment of the present invention.

As shown in FIG. 2, a first embodiment of the present invention provides a display device 100, which includes a middle frame 104, a first substrate 101, a second substrate 102, a cover plate 103, an ink layer 108, and a silicone glue 109.

The middle frame 104 includes a bottom plate 1041 and a side frame 1042, the side frame 1042 is disposed perpendicular to the bottom plate 1041, and the middle frame 104 is formed integrally. Of course, in other embodiments, the middle frame 104 can also adopt a split structure and be formed by assembly and combination.

The first substrate 101 includes a display region 120 and a non-display region 130, and the first substrate 101 is positioned above the bottom plate 1041. The first substrate 101 is an array substrate.

The second substrate 102 is positioned above the display region 120 of the first substrate 101, and the second substrate 102 is a color filter substrate.

In the present embodiment, a liquid crystal layer is provided between the first substrate 101 and the second substrate 102. Because the present invention does not involve a structure of the liquid crystal layer, it is not shown in FIG. 2.

The cover plate 103 is disposed above the second substrate 102 and the side frame 1042.

The ink layer 108 is disposed on a side of the cover plate 103 close to the first substrate 101 and corresponds to the non-display region 130. A part of the ink layer 108 is positioned corresponding to a position of the middle frame 104, specifically, is disposed in an L-shaped opening of the middle frame 104, and is bonded to the middle frame 104 through an adhesive layer.

The silicone glue 109 is disposed between the ink layer 108 and the first substrate 101 and corresponds to the non-display region 130.

A barrier structure 1011 is provided on a side of the ink layer 108 close to the first substrate 101.

The barrier structure 1011 is a barrier block, and the barrier structure 1011 is disposed between the silicone glue 109 and the side frame 1042.

The barrier structure 1011 is configured to block precipitation and diffusion of the silicone glue 109, and a material of the barrier block includes ink. A thickness of the barrier block is same as a thickness of the silicone glue 109.

The ink used as the barrier block has a special formula and printing process, and has a function of preventing the diffusion of pollution sources (silicone oil). The ink requires a smooth surface and is not prone to physical diffusion such as capillary.

Figure 3:
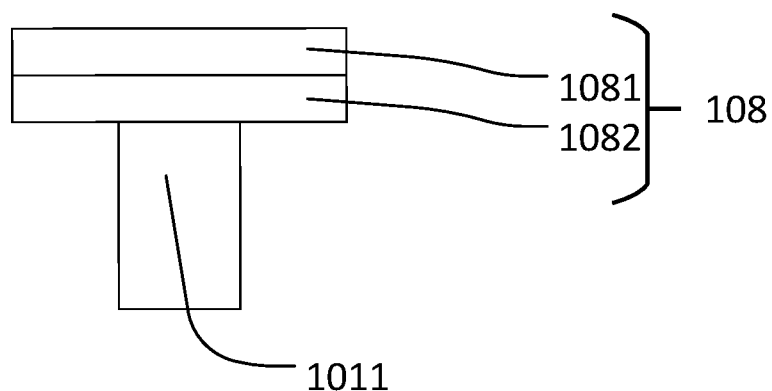
FIG. 3 is a schematic structural diagram of an ink layer and a barrier block according to the first embodiment of the present invention.

As shown in FIG. 3, the ink layer 108 includes a first ink layer 1081 and a cover bottom layer 1082.

The first ink layer 1081 is disposed on the side of the cover plate 103 close to the first substrate 101.

The cover bottom layer 1082 is disposed on a side of the first ink layer 1081 away from the cover plate 103.

The barrier structure 1011 is disposed on a side of the cover bottom layer 1082 away from the first ink layer 1081.

The barrier block is formed by printing a barrier ink, times of printing is not less than one printing, and a printing thickness is greater than 7 um. In a printing process of a glass cover plate 103 (such as black ink), after a main body black and a ground black (i.e. the ink layer 108) are printed, a step of "barrier ink" is added to form the barrier block 1011, and a region of that is finally cleaned.

A surface pattern of the barrier block can be made into a stripe shape or a grid shape, or a shape with a flat surface, to prevent capillary phenomenon on a surface of the ink layer 108.

In an embodiment, the display device 100 further includes a lower polarizer 105, an upper polarizer 106, an optically clear adhesive (OCA) glue layer 107, and a backlight structure 110.

The lower polarizer 105 is disposed on a side of the first substrate 101 away from the second substrate 102.

The upper polarizer 106 is disposed on a side of the second substrate 102 away from the first substrate 101.

The OCA glue layer 107 is disposed between the upper polarizer 106 and the cover plate 103.

The backlight structure 110 is disposed between the lower polarizer 105 and the bottom plate 1041.

The backlight structure 110 includes a backplate 111, a reflective layer 112, a light guide plate 113, a scattering layer 114, a prism layer 115, and a backlight source 117.

The backplate 111 includes a support plate 1111 and a side plate 1112, and the side plate 1112 is disposed perpendicular to the support plate 1111.

The reflective layer 112 is disposed on the support plate 1111. The light guide plate 113 is disposed on the reflective layer 112. The scattering layer 114 is disposed on the light guide plate 113. The prism layer 115 is disposed on the scattering layer 114. The backlight source 117 is disposed at one end of the light guide plate 113 and is disposed on the side plate 1112.

A spacer pad 116 is provided between the side plate 1112 and the lower polarizer 105, a chip-on-film 1012 is provided on the lower polarizer 105, and the chip-on-film 1012 is bent downward to a bottom of the support plate 1111.

The first embodiment of the present invention provides a display device 100, and by providing the barrier structure 1011 disposed on the side of the ink layer 108 close to the first substrate 101, the barrier structure 1011 is disposed between the silicone glue 109 and the side frame 1042 to prevent the ink layer 108 on the cover plate 103 from spreading of a pollution source, so that the surface of the ink layer 108 of the glass cover plate 103 of a display module can meet dyne specification requirements. It also ensures an adhesive strength of the middle frame 104 and the cover plate 103 to prevent bonding failure.

Figure 4:
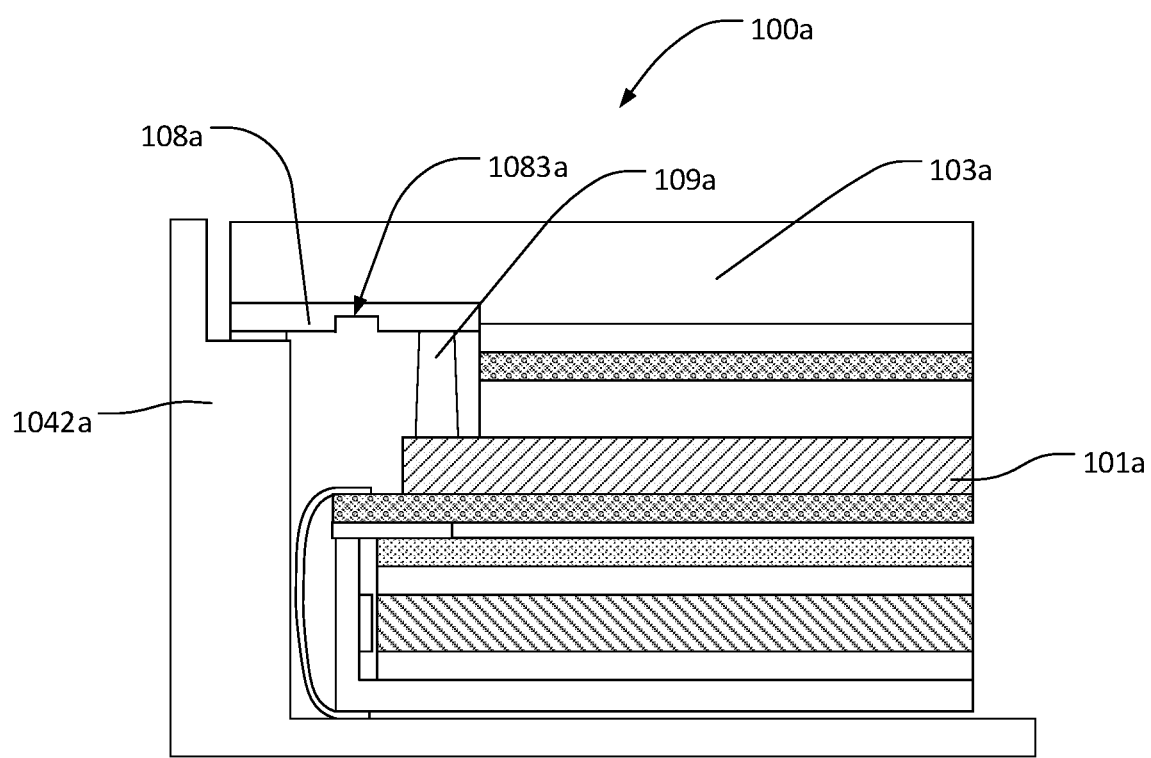
FIG. 4 is a schematic structural diagram of a display device according to a second embodiment of the present invention.
Figure 5:
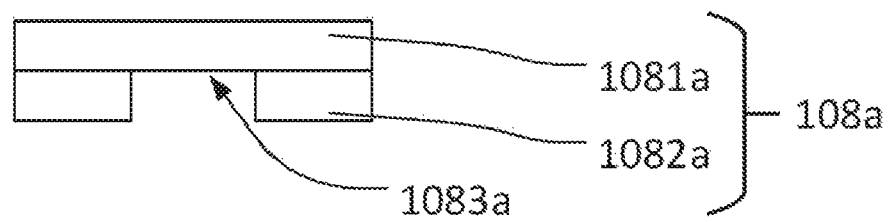
FIG. 5 is a schematic structural diagram of an ink layer and a slot according to the second embodiment of the present invention.

As shown in FIG. 4 and FIG. 5, a second embodiment of the present invention provides the display device 100a. Compared with the first embodiment, the difference lies in that the ink layer 108a is provided with a barrier structure 1083a on a side close to the first substrate 101a. The barrier structure 1083a is a slot.

The slot extends from an upper surface of the cover bottom layer 1082a downward to an upper surface of the first ink layer 1081a.

The slot is defined between the side frame 1042 and the silicone glue 109, and the slot is a blocking slot for separating a diffusion channel of the silicone glue 109.

In the second embodiment, during an ink printing process of the first ink layer 1081a and the cover bottom layer 1082a, before finishing a printing process of the final cover bottom layer 1082a, the slot 1083a is patterned by a printing screen, and finally cleaned.

The second embodiment of the present invention provides the display device 100a, and by providing the slot (barrier structure 1083a) disposed on the side of the ink layer 108 close to the first substrate 101, the slot is defined between the silicone glue 109a and the side frame 1042a to prevent the ink layer 108a from spreading of a pollution source, so that the surface of the ink layer 108 of the glass cover plate 103 of the display module can meet dyne specification requirements. It also ensures an adhesive strength of the middle frame 104a and the cover plate 103a to prevent bonding failure.

Figure 6:
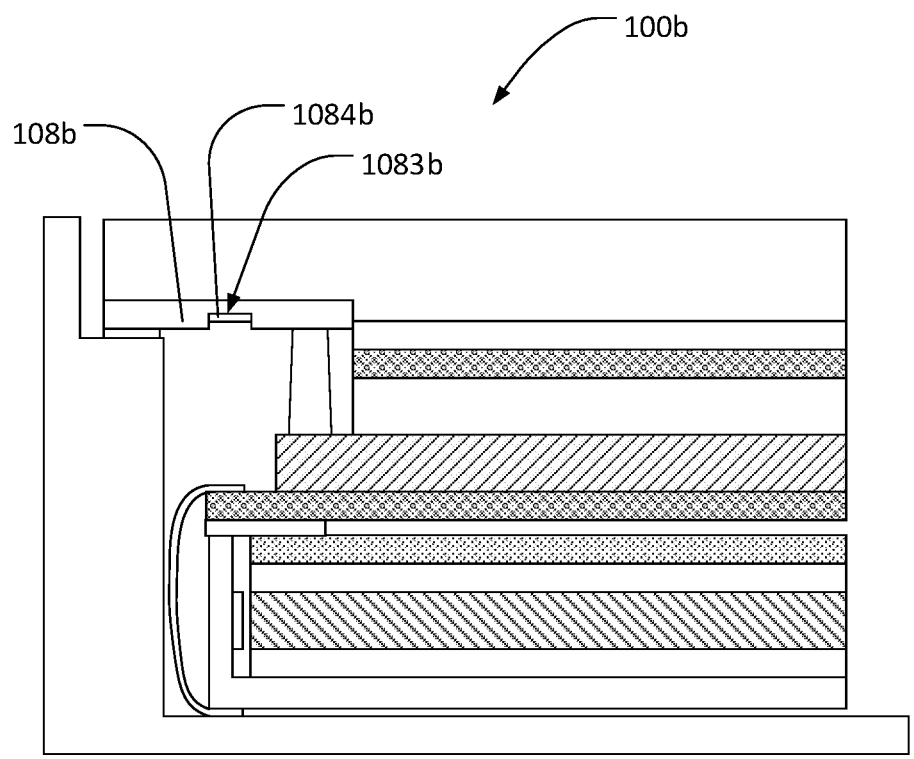
FIG. 6 is a schematic structural diagram of a display device according to a third embodiment of the present invention.
Figure 7:
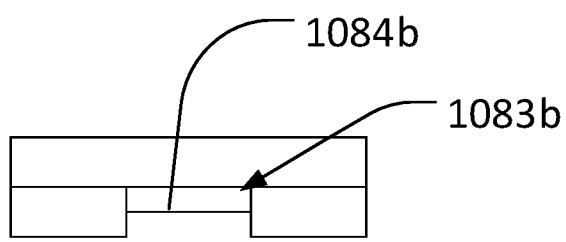
FIG. 7 is a schematic structural diagram of an ink layer, a slot, and a printing ink layer according to the third embodiment of the present invention.

As shown in FIG. 6 and FIG. 7, a third embodiment of the present invention provides the display device 100b. Compared with the second embodiment, the difference lies in that a printing ink layer 1084b is provided inside the slot (barrier structure 1083b) of the ink layer 108b.

The printing ink layer 1084b can prevent the physical diffusion of pollution sources, and a barrier effect of the third embodiment is better than that of the second embodiment.

Embodiments of the present invention have been described, but not intended to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display device, comprising:
   a middle frame comprising a bottom plate and a side frame;
   a first substrate comprising a display region and a non-display region disposed above the bottom plate;
   a second substrate disposed above the display region of the first substrate;
   a cover plate disposed above the second substrate and the side frame;
   an ink layer disposed on a side of the cover plate close to the first substrate and corresponding to the non-display region, wherein a part of the ink layer is positioned corresponding to the middle frame; and
   a silicone glue disposed between the ink layer and the first substrate and corresponding to the non-display region;
   wherein a barrier structure is provided on a side of the ink layer close to the first substrate.

2. The display device according to claim 1, wherein the barrier structure comprises a slot.

3. The display device according to claim 1, wherein the barrier structure comprises a barrier block.

4. The display device according to claim 1, wherein the ink layer comprises a first ink layer disposed on the side of the cover plate close to the first substrate, and a cover bottom layer disposed on a side of the first ink layer away from the cover plate.

5. The display device according to claim 3, wherein the barrier block is disposed between the side frame and the silicone glue.

6. The display device according to claim 5, wherein a thickness of the barrier block is same as a thickness of the silicone glue.

7. The display device according to claim 3, wherein a material of the barrier block comprises ink.

8. The display device according to claim 4, wherein the barrier structure is disposed on a side of the cover bottom layer away from the first ink layer.

9. The display device according to claim 2, wherein the slot is defined between the side frame and the silicone glue.

10. The display device according to claim 9, wherein the ink layer comprises a first ink layer disposed on the side of the cover plate close to the first substrate, and a cover bottom layer disposed on a side of the first ink layer away from the cover plate, and wherein the slot extends downward to an upper surface of the first ink layer.

11. The display device according to claim 9, wherein a printing ink layer is arranged in the slot.

12. The display device according to claim 1, further comprising:
- a lower polarizer disposed on a side of the first substrate away from the second substrate;
- an upper polarizer disposed on a side of the second substrate away from the first substrate;
- an optically clear adhesive (OCA) glue layer disposed between the upper polarizer and the cover plate; and
- a backlight structure disposed between the lower polarizer and the bottom plate.

13. The display device according to claim 12, wherein the backlight structure comprises:
- a backplate comprising a support plate and a side plate;
- a reflective layer disposed on the support plate;
- a light guide plate disposed on the reflective layer;
- a scattering layer disposed on the light guide plate;
- a prism layer disposed on the scattering layer; and
- a backlight source disposed at an end of the light guide plate and disposed on the side plate.

* * * * *